United States Patent Office 3,270,504
Patented Sept. 6, 1966

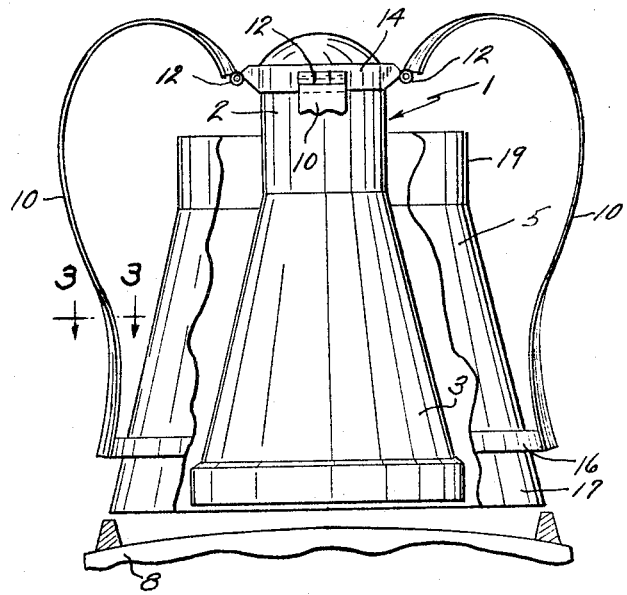
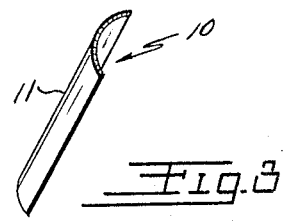
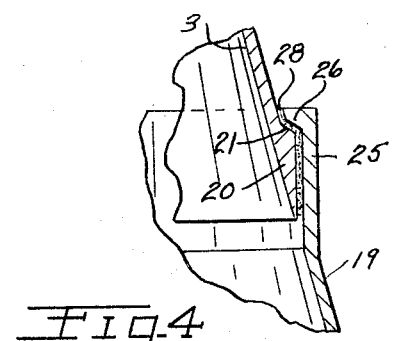
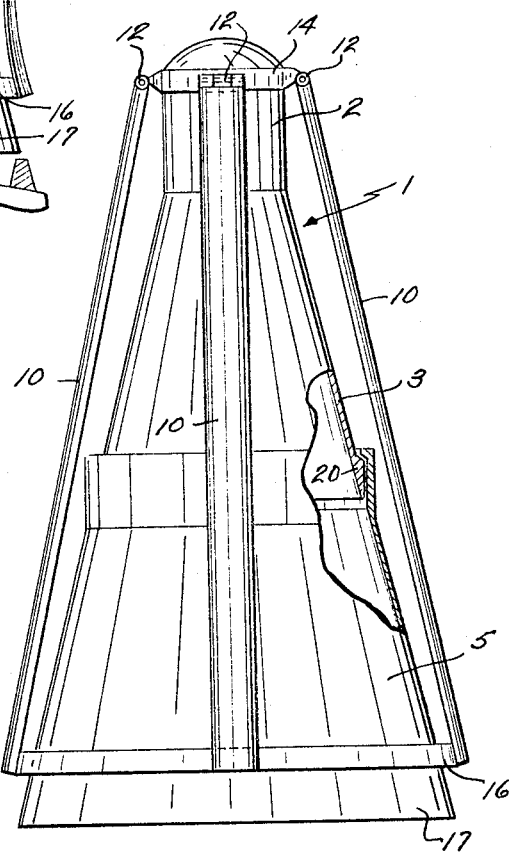
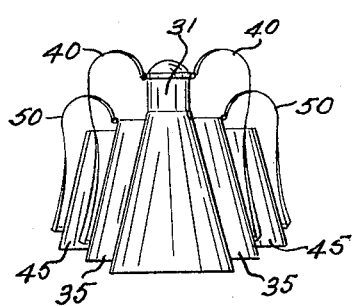

3,270,504
AUTOMATICALLY DEPLOYING NOZZLE
EXIT CONE EXTENSION
Donald R. Ward, Garfield Heights, Ohio, assignor to the United States of America as represented by the Administrator of the National Aeronautics and Space Administration
Filed July 20, 1965, Ser. No. 473,535
10 Claims. (Cl. 60—35.6)

The invention described herein may be manufactured and used by or for the Government of the United States of America for governmental purposes without the payment of any royalties thereon or therefor.

The present invention relates to an exit cone assembly having an extension for a nozzle that can be automatically deployed into its extended position when the preceding stage is separated from the assembly. The invention more particularly relates to an exit cone assembly having means for increasing the exit cone area ratio of a rocket nozzle to thereby obtain an increase in engine thrust without using a corresponding increase in propellant weight.

It is an object of the present invention to provide an exit cone assembly for a rocket nozzle that has an automatically deployed extension to thereby obtain an increased exit cone area ratio.

It is an object of the present invention to provide an exit cone assembly for a rocket nozzle in which an extension for the nozzle is provided with extending means for automatically deploying said extension to its extended position when the lower stage separates from the exit cone assembly, said extending means including a plurality of snap columns connected between the nozzle and the extension.

It is an object of the present invention to provide an exit cone assembly including a nozzle and an extension therefor, means for deploying the extension to its extended position and sealing means for providing a fluid-tight seal between said extension and said nozzle.

These and other objects will become apparent from the specification that follows, the appended claims, and the drawings, in which:

FIG. 1 is a fragmentary front elevational view of an exit cone assembly embodying the present invention and showing a nozzle extension in its collapsed position around a nozzle;

FIG. 2 is a front elevational view of the exit cone assembly of FIG. 1 showing the extension in its extended position;

FIG. 3 is a sectional view of a snap column provided to automatically deploy the extension to its extended position, the view being taken along the line 3—3 indicated in FIG. 1;

FIG. 4 is a fragmentary enlarged sectional view showing the sealing engagement between the extension and the nozzle; and FIG. 5 is a front elevational view of an exit cone assembly having two automatically deployable extensions in cascade arrangement.

The present invention provides an exit cone assembly comprising an exit rocket nozzle for a combustion chamber of a rocket and an extension for said nozzle that can be automatically deployed to an extended position when the prior stage falls away from the rocket. The extension of the nozzle increases the exit cone area ratio of the rocket nozzle which results in an increased specific impulse and heavier mission payloads.

There is shown in FIG. 1 an exit cone assembly comprising an exit nozzle 1 having a small end portion 2 and a large end portion 3 and an exit cone extension 5 telescoped around said nozzle in a collapsed or retracted position. The extension 5 is automatically deployed to its extended position when the prior stage 8 separates from the exit cone assembly. A plurality of snap columns 10 are provided to move the extension from its collapsed position shown in FIG. 1 to its extended position shown in FIG. 2, each snap column 10 being in a bent position in FIG. 1 and in a straight position in FIG. 2. As can be seen in FIG. 2, each column 10 becomes a rigid axial load carrying member in its extended position.

The extension 5 can be retracted to its collapsed position when desired, the column being flexible and when bent as shown in FIG. 1 has an arcuate cross sectional area as best seen in FIG. 3. The column, as seen in FIG. 3, has an exterior surface 11 that is convex, the center of column being bent upwardly a distance about 3/10 to 5/10 of the width of said column and a distance of about 3 to 5 times the thickness of said column.

Although the snap column may be of various lengths and widths depending upon the design of the extension and the nozzle, in the preferred embodiment shown in the drawings, the length is preferably about 15 to 25 times the width which, in turn, is about 8 to 15 times the thickness. As seen in FIG. 1, each column is bent into a folded position that generally resembles a question mark, the height of the folded column being only about 1/2 to 2/3 the length of the column in its extended position.

Each of the columns 10 is connected at one end to a collar 14 at the small end of the nozzle by a suitable means such as a pin 12 so that the end of the column can be pivoted about said pin connection. Each snap column 10 is rigidly connected to the extension 5 by means of a ring 16 that encircles the extension 5 at its large end portion 17, the ring 16 being rigidly attached to said extension and generally perpendicular to longitudinal axis thereof.

As best seen in FIGS. 2 and 3, the extension 5 has a small end portion 19 that moves into sealing engagement with the large end portion 3 of said nozzle, the extension having a generally circular cross sectional area and a frusto-conical shape whereby the small end portion 19 is gradually enlarged into said large end portion 17. The small end portion 19 of the extension is of about the same size as the large end portion 3 of the nozzle, the portion 3 being provided with an annular projection 20 having a shoulder 21. The small end portion 19 of the extension is provided with an annular rim 25 having a lip 26 for locking engagement with the shoulder 21, the lip 26 coming into contact with the shoulder at the extended position of the extension whereby the lip 26 and shoulder 21 remain in abutting relationship to provide a joint with a self-locking taper.

For the best fluid-tight seal between the small end of the extension and the large end of the nozzle the rim 25 and the projection 20 including the shoulder 21 and the lip 26 are preferably sealed by self-welding to form a sealing layer 28 by the correct choice of self-weld material coatings on said rim and said projection.

In the preferred embodiment shown in the drawings, there are four snap columns distributed an equal distance apart circumferentially about the nozzle 1. However, a small number or a greater number, said six to eight columns can also be used, provided they are equally spaced around the nozzle to provide lateral stability particularly when the cone extension 5 is being moved to its extended position.

As seen in FIG. 5, an exit cone assembly is provided having two automatically deployable cone extensions in cascade arrangement. An exit nozzle 31 similar in construction to nozzle 1 is provided. Telescoped around the nozzle 31 in a retracted position is a first cone extension 35 similar in construction to extension 5. Connected between said nozzle 31 and extension 35 are a plurality of snap columns 40, each snap column 40 being similar in construction to snap column 10. A second cone extension 45 is provided for further extension of said nozzle, said second extension 45 being movable with respect to the first extension 35 in the same manner that extension 35 is movable with the nozzle 31. A plurality of snap columns 50 are provided to extend said extension 35, such snap columns being spaced equally circumferentially around said nozzle 31 and said first extension 35. In the case of each of the snap columns 50, one end thereof is pin-connected to the small end portion of the first extension 35 and the other end is rigidly attached to the large end portion of said second extension 45.

The present invention thus provides an improved exit cone assembly having great advantages resulting from the use of a simple yet reliable nozzle extending means for increasing the exit cone area ratio of a rocket nozzle. The advantages of such an exit cone assembly, in addition to the highly desirable increase in the exit cone area ratio, are its simple construction, its light weight, its entirely mechanical nature, its automatic extension, its property of being capable of extension and retraction many times for testing purposes, and its high reliability.

It is to be understood that various modifications of the present invention may be made which, according to the patent statutes are within the spirit and scope of the invention.

What is claimed is:

1. An exit cone assembly comprising an exit nozzle for a rocket, an exit cone extension having a collapsed position in which it is in a telescoped relationship with said nozzle and an extended position effective to extend the length of the nozzle and increase the cross-sectional area thereof, means for moving the extension from its collapsed position to its extended position comprising a plurality of snap columns, operably connected between said nozzle and said extension, that are in a bent position in said collapsed position of the extension and are in a straight rigid position in said extended position of the extension.

2. An exit cone assembly adapted for use with a rocket, the assembly comprising an exit nozzle, an exit cone extension located radially outwardly from said nozzle whereby said nozzle is nested with said extension, moving means for extending and retracting said extension along the longitudinal axis of the nozzle effective to move the extension to an extended position and a collapsed position, said moving means comprising a plurality of snap columns operably connected between said nozzle and said extension, and sealing means for providing a fluid-tight seal between said extension and said nozzle when the extension is in its extended position.

3. An exit cone assembly for a rocket comprising an exit nozzle having a generally circular cross section, said nozzle having a small end portion and a large end portion in which said cross section gradually increases to provide a frusto-conical shape, an extension that is movable into engagement with said large end portion of the nozzle effective to extend said nozzle, said extension having a frusto-conical shape and a small end portion that is about the same size as said large end portion of the nozzle and adapted for sealing engagement therewith, and extending means for moving said extension from a collapsed position to an extended position whereby the small end portion of the extension is in sealing engagement with the end portion of the nozzle, said extending means comprising a plurality of snap columns connected between said nozzle and said extension, said columns being distributed circumferentially around the nozzle and spaced apart substantially equally from each other.

4. An exit cone assembly as defined in claim 1 in which there are four snap columns.

5. An exit cone assembly as defined in claim 1 in which each snap column has an arcuate cross sectional area in the collapsed position of the extension and each column is bent in the collapsed position to about one-half to two-thirds of its length in the extended position.

6. An exit cone assembly as defined in claim 1 in which there is a second extension that is in nested relation with the first extension, the second extension being movable to an extended position effective to further extend said nozzle and said first extension, and extending means comprising a second set of snap columns for moving the second extension from a collapsed position to said extended position.

7. An exit cone assembly comprising an exit nozzle for the exit end of a combustion chamber of a rocket, a retractable exit cone extension to extend the length of said nozzle, the exit nozzle being telescoped within said extension in the collapsed position of said extension, extending means for moving the extension along the longitudinal axis of said nozzle effective to move the extension to its extended position, said extending means comprising a snap column connected at one end thereof to the extension and at the other end to the nozzle, and sealing means for providing a fluid-tight seal between said extension and said nozzle in the extended position.

8. An exit cone assembly for a rocket comprising an exit nozzle having a generally circular cross section, said nozzle having a small end portion and a large end portion in which said cross section gradually increases to provide a frusto-conical shape, an extension that is movable into engagement with said large end portion of the nozzle effective to extend said nozzle, said extension having a frusto-conical shape and a small end portion that is about the same size as said large end portion of the nozzle and adapted for sealing engagement therewith, and extending means for moving said extension from a collapsed position to an extended position whereby the small end portion of the extension is in sealing engagement with the end portion of the nozzle, said extending means comprising a plurality of snap columns connected between said nozzle and said extension, said columns being distributed circumferentially around the nozzle and spaced apart substantially equally from each other, and sealing means for providing a fluid-tight relation between said extension and said nozzle in the extended position, said sealing means including an annular projection around the large end portion of the nozzle, and an annular rim on the small end portion of the extension effective to snugly fit around said projection on the nozzle to provide a fluid-tight seal therebetween.

9. An exit cone assembly for a rocket comprising an exit nozzle having a generally circular cross section, said nozzle having a small end portion and a large end portion in which said cross section gradually increases to provide a frusto-conical shape, an extension that is movable into engagement with said large end portion of the nozzle effective to extend said nozzle, said extension having a frusto-conical shape and a small end portion that is about the same size as said large end portion of the nozzle and adapted for sealing engagement therewith, and extending means for moving said extension from a collapsed position to an extended position whereby the small end portion of the extension is in sealing engagement with the end portion of the nozzle, said extending means comprising a plurality of snap columns connected between said nozzle and said extension, said columns being distributed circumferentially around the nozzle and spaced apart substantially equally from each other, and sealing means for providing a fluid-tight relation between said extension and said nozzle in the extended position, said sealing means including an annular projection around the large end portion of the nozzle, and an annular rim on the small end portion of the extension effective to snugly fit around said projection on the nozzle to provide a fluid-tight seal therebetween, the projection having an annular shoulder and the rim having an annular lip that engages said shoulder to lock the same in sealing engagement.

10. An exit cone assembly as defined in claim 8 in which said projection and said rim are rigidly connected by self-welding when the extension is moved into the extended position.

References Cited by the Examiner

UNITED STATES PATENTS

| | | | |
|---|---|---|---|
| 2,989,845 | 6/1961 | Howald | 60—35.6 |
| 3,049,873 | 8/1962 | Weeks | 60—35.6 |
| 3,146,669 | 9/1964 | Wolf | 89—1.7 |
| 3,183,664 | 5/1965 | Divone | 60—35.6 |
| 3,184,916 | 5/1965 | Ravel | 60—35.6 |

MARK NEWMAN, *Primary Examiner.*

R. D. BLAKESLEE, *Assistant Examiner.*